United States Patent
Jeong

(10) Patent No.: US 7,990,370 B2
(45) Date of Patent: Aug. 2, 2011

(54) DISPLAY APPARATUS HAVING A PLURALITY OF INPUT TERMINALS AND METHOD THEREOF

(75) Inventor: Jae-kwon Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 875 days.

(21) Appl. No.: 11/846,735

(22) Filed: Aug. 29, 2007

(65) Prior Publication Data

US 2008/0225038 A1     Sep. 18, 2008

(30) Foreign Application Priority Data

Mar. 12, 2007 (KR) .................. 10-2007-0024036

(51) Int. Cl.
*G06F 3/038* (2006.01)
(52) U.S. Cl. ......... 345/204; 345/156; 345/671; 715/856
(58) Field of Classification Search .................. 345/160, 345/161, 169, 204, 670, 671, 156, 157; 715/825–829, 856
See application file for complete search history.

(56) References Cited

U.S. PATENT DOCUMENTS

| | | | |
|---|---|---|---|
| 6,122,018 A | 9/2000 | Sugihara et al. | |
| 2002/0081096 A1* | 6/2002 | Watanabe et al. | 386/83 |
| 2004/0055006 A1 | 3/2004 | Iwamura | |
| 2004/0239816 A1 | 12/2004 | Ando | |
| 2005/0060660 A1 | 3/2005 | Song | |
| 2005/0264702 A1* | 12/2005 | Yoshii | 348/687 |
| 2006/0164561 A1 | 7/2006 | Lacy et al. | |
| 2006/0230360 A1 | 10/2006 | Young et al. | |
| 2007/0028289 A1* | 2/2007 | Koshino | 725/136 |
| 2007/0094617 A1* | 4/2007 | Nurmi | 715/856 |
| 2009/0282350 A1* | 11/2009 | Kawasaki et al. | 715/764 |

FOREIGN PATENT DOCUMENTS

KR   1020030093467 A   12/2003

OTHER PUBLICATIONS

Communication issued Feb. 17, 2011 in counterpart European Application No. 07120724.5.

* cited by examiner

*Primary Examiner* — Kimnhung Nguyen
(74) *Attorney, Agent, or Firm* — Sughrue Mion, PLLC

(57) ABSTRACT

A display apparatus having a plurality of input terminals is provided. The display apparatus includes a plurality of input terminals, and an output unit for displaying on a screen a graphic image corresponding to the arrangement of the plurality of input terminals. Graphic images corresponding to an arrangement of the plurality of input terminals provided in the display apparatus are displayed on a screen so that a user can easily determine a connection state of the external apparatus. A method for displaying a graphic image corresponding to an arrangement of the input terminals of a display apparatus is also provided.

15 Claims, 7 Drawing Sheets

DISPLAY APPARATUS HAVING A PLURALITY OF INPUT TERMINALS AND METHOD THEREOF

CROSS-REFERENCE TO RELATED APPLICATIONS

This application claims priority under 35 U.S.C. §119 (a) from Korean Patent Application No. 10-2007-0024036, filed on Mar. 12, 2007, the entire contents of which are hereby incorporated by reference.

BACKGROUND OF THE INVENTION

1. Field of the Invention

The present invention relates to a display apparatus having a plurality of input terminals, and a method thereof. More particularly, the present invention relates to a display apparatus for displaying graphic images corresponding to an arrangement of a plurality of input terminals on a display, and a method thereof.

2. Description of the Related Art

Modern display apparatuses may receive various external signals from external devices in addition to broadcast signals received through an antenna. External devices which may be connected to the input terminal of the display apparatus to provide external signals may include video cassette recorders (VCRs), digital versatile discs (DVD) players, satellite broadcasting receivers, personal computers (PCs), and game devices.

If a user changes an external apparatus when using a display apparatus while an external signal is being reproduced, the user can sequentially select the external apparatus by pressing an external apparatus convert key provided on a remote control. Alternatively, the user can select an external apparatus by outputting an external apparatus list image.

When an external apparatus connectable to a conventional display apparatus is changed, a user can determine whether or not the external apparatus is connected, but the user cannot know which external apparatus is plugged into which input terminal. If the name of the external apparatus displayed in an external apparatus list is replaced by an identifier such as component 1 or component 2, a user cannot know which external apparatus is connected to the component 1 and has to check the back of the display apparatus. Considering that a display apparatus may be positioned near a wall, such a checking process can be cumbersome to a user.

SUMMARY OF THE INVENTION

Exemplary embodiments of the present invention address at least the above problems and/or disadvantages and other disadvantages not described above. Also, the present invention is not required to overcome the disadvantages described above, and an exemplary embodiment of the present invention may not overcome any of the problems described above. Accordingly, an aspect of exemplary embodiments of the present invention provides a display apparatus which enables a user to determine the connection state of an external apparatus and a method thereof by displaying on a screen an image corresponding to an arrangement of a plurality of input terminals.

According to an exemplary aspect of the present invention, a display apparatus comprises a plurality of input terminals; and an output unit for outputting on a screen a graphic image corresponding to the arrangement of the plurality of input terminals.

The output unit may classify and output the image of the plurality of input terminals according to the type of input terminal.

The output unit may display text indicating the type of input terminal at one side of the image of the plurality of input terminals.

The apparatus may comprise a determining unit for determining whether or not each input terminal of the plurality of input terminals receives an external signal; and a control unit for controlling the output unit to activate an image of an input terminal receiving an external signal, and to deactivate an image of an input terminal not receiving the external signal according to the determination by the determining unit.

The output may display the output state of the input terminals connected to the same apparatus in an activated state or a deactivated state according to whether the input terminals are connected to the same apparatus.

The apparatus may comprise an input unit; a storage unit for storing graphic images corresponding to the arrangement of the plurality of input terminals, wherein if an output command to display the connection state of the external apparatus is input through the input unit, the output unit displays on the screen the graphic image stored in the storage.

The output unit may display a cursor movement, so the cursor only moves over an image corresponding to an activated input terminal among the plurality of input terminals and skips over a deactivated input terminal, while the graphic image is displayed on the screen according to a movement command input through the input unit.

If an enlargement display command of a specific input terminal image is input through the input unit while the graphic image is displayed on the screen, the output unit enlarges the input terminal image and outputs the enlarged input terminal image.

If a selection command of the specific input terminal image is input through the input unit while the graphic image is displayed on the screen, the output unit processes an external signal received from the specific input terminal, and outputs the processed external signal on the screen.

According to another exemplary aspect of the present invention there is provided, a method for displaying a graphic image of a display apparatus having a plurality of input terminals, the method comprising receiving an output command to display the connection state of an external apparatus; and, if the output command is input, outputting a graphic image corresponding to the arrangement of the plurality of input terminals on a screen.

The outputting may comprise classifying and displaying on the screen the image of the plurality of input terminals according to the type of input terminal.

The outputting may comprise displaying text indicating the type of input terminal at one side of the image of the plurality of input terminals.

The method may further comprise determining whether or not the plurality of input terminals receive an external signal, wherein the outputting comprises displaying the graphic image to activate an image of an input terminal receiving an external signal, and to deactivate an image of an input terminal not receiving the external signal according to the determined result.

The outputting may comprise displaying the output state of the first group of input terminals connected to the same apparatus as either an activated state or a deactivated state according to whether the input terminals are connected to the same apparatus.

The outputting may comprise displaying movement of a cursor, to enable the cursor to move over an image of an activated input terminal among the plurality of input terminals, and to skip over an image of a deactivated input terminal according to an input cursor movement command.

If an enlargement display command of a specific input terminal image is input while the graphic image is displayed on the screen, the outputting comprises enlarging the input terminal image and outputting the enlarged input terminal image.

If a selection command of the specific input terminal image is input while the graphic image is displayed on the screen, the outputting comprises processing an external signal received from the specific input terminal, and outputting the processed external signal on the screen.

BRIEF DESCRIPTION OF THE DRAWINGS

The above and other objects, features and advantages of certain exemplary embodiments of the present invention will be more apparent from the following description taken in conjunction with the accompanying drawing, in which.

Throughout the drawings, the same drawing reference numerals will be understood to refer to the same elements, features and structures.

DETAILED DESCRIPTION OF EXEMPLARY EMBODIMENTS OF THE INVENTION

The matters defined in the description such as a detailed construction and elements are provided to assist in a comprehensive understanding of exemplary embodiments of the invention. Accordingly, those of ordinary skill in the art will recognize that various changes and modifications of the exemplary embodiments described herein can be made without departing from the scope and spirit of the invention. Also, descriptions of well-known functions and constructions are omitted for clarity and conciseness.

Figure 1:
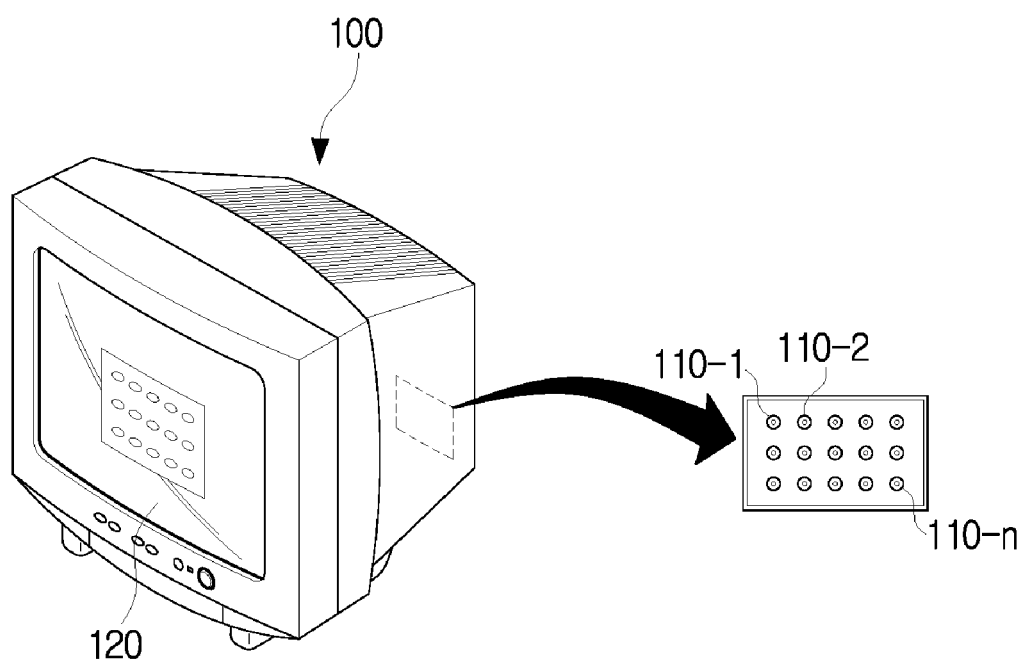
FIG. 1 is a view illustrating a display apparatus according to an exemplary embodiment of the present invention.

FIG. 1 is a view illustrating a display apparatus according to an exemplary embodiment of the present invention. As illustrated in FIG. 1, the display apparatus 100 may comprise a plurality of input terminals 110-1, 110-2, . . . 110-N, and an output unit 120.

The plurality of input terminals 110-1, 110-2, . . . 110-N are provided on the back of the display apparatus 100. The plurality of input terminals 110-1, 110-2, . . . 110-N are connected to a plurality of external apparatuses, and receive an external signal from each of the external apparatuses. The input terminals may be antenna ports, video tape recorder (VTR) ports, component ports, personal computer (PC) ports, or universal serial bus (USB) ports, and the plurality of input terminals 110-1, 110-2, . . . 110-N may be disposed in a fixed arrangement to be connected to the external apparatus.

The output unit 120 outputs a graphic image on a display. Specifically, the output unit 120 outputs a graphic image which represents the arrangement of the plurality of input terminals 110-1, 110-2, . . . 110-N included in the display apparatus 100 on the display. The output unit 120 outputs the connection state of the external apparatus on the display by displaying the output state of an external apparatus connection terminal differently to the output state of a non-external apparatus connection terminal. Therefore, a user can easily recognize the state in which the external apparatus is connected to the display apparatus 100.

The plurality of input terminals 110-1, 110-2, . . . 110-N are provided on the back of the display apparatus 100, but the input terminals may be provided at various positions such as the left or right sides, or the top or bottom of the display apparatus 100.

Figure 2:
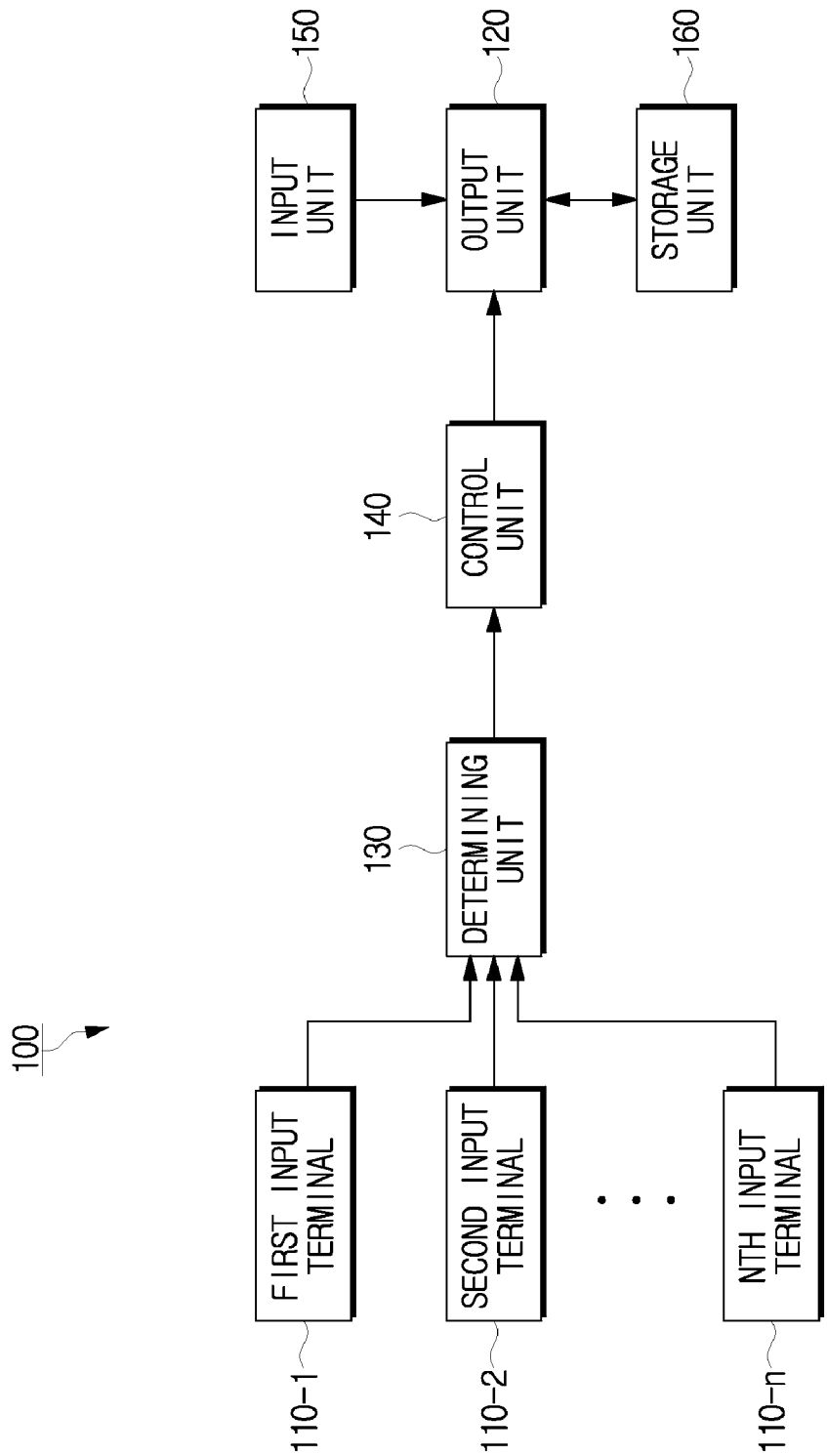
FIG. 2 is a block diagram illustrating the display apparatus of FIG. 1.

FIG. 2 is a block diagram illustrating the display apparatus of FIG. 1. Referring to FIG. 2, the display apparatus 100 may comprise a plurality of input terminals 110-1, 110-2, . . . 110-N, an output unit, a determining unit 130, a control unit 140, an input unit 150, and a storage unit 160.

The plurality of input terminals 110-1, 110-2, . . . 110-N are connected to a plurality of external apparatuses and receive an external signal from each of the external apparatuses.

The determining unit 130 determines whether the plurality of input terminals 110-1, 110-2, . . . 110-N receive the external signal. Whether or not the external signal is received is determined by checking a plugging of a cable jack in the plurality of input terminals 110-1, 110-2, . . . 110-N. That is, because the voltage magnitude detected from the input terminals varies according to whether the cable jack is plugged into an input terminals, the determining unit 130 may determine whether the external signal is received by checking the voltage of each of the plurality of input terminals 110-1, 110-2, . . . 110-N.

The storage unit 160 stores graphic images corresponding to the arrangement of the plurality of input terminals included in the display apparatus 100.

The input unit 150 receives commands. The input unit 150 may receive an output command directing to output the connection state of the external apparatus, or an enlargement output command for enlarging an image of the specific input terminal while a graphic image is displayed on a screen. Additionally, the input unit 150 may receive a selection command directing to output an external signal. The commands may be input using buttons on a body of a display apparatus or remote control.

If an output command is input through the input unit 150, the output unit 120 reads out the graphic image corresponding to the arrangement of the plurality of input terminals 110-1, 110-2, . . . 110-N from the storage unit 160, and outputs the read graphic image on the screen. In this case, the output unit 120 displays text indicating the type of input terminal at one side of the image of the plurality of input terminals 110-1, 110-2, . . . 110-N. For example, 'PC' may be represented at one side of an image of an input terminal connected to a personal computer (PC). Accordingly, a user can confirm that the PC is connected to the input terminal.

The output unit 120 may classify and output the images of the plurality of input terminals 110-1, 110-2, . . . 110-N according to the type of input terminal. For example, the images of input terminals which may be connected to a PC, and the images of input terminals which may be connected to a videocassette recorder (VCR), may be classified and output.

The output unit 120 may output the activated image or the deactivated image of the input terminals according to a control of the control unit 140. For example, the control unit 140 may control the output unit 120 to activate the image of the input terminal receiving an external signal, and to deactivate the image of the input terminal not receiving the external signal, according to the result of determining by the determining unit 130. The output unit 120 then outputs the graphic image on a screen in a different output state according to whether or not the external signals are received from the plurality of input terminals 110-1, 110-2, ... 110-N. Accordingly, a user knows that the input terminal corresponding to the activated image is connected to the external apparatus, and the input terminal corresponding to the deactivated image is not connected to the external apparatus.

If one external apparatus is connected to the display apparatus 100, more than one input terminal may be used. For example, if a DVD is connected to a display apparatus 100, five input terminals, such as left and right audio input terminals and Pb/Pr/Y input terminals, may be used. The right and left audio input terminals, and Pb/Pr/Y input terminals belong to a first group to be connected to the same apparatus (for example, a DVD) among the plurality of input terminals.

The output unit 120 outputs the output state of the input terminals connected to the same apparatus according to whether the input terminals are connected to the same apparatus in an activated state or a deactivated state. For example, if five (5) input terminals belong to the first group connected to the DVD among the plurality of input terminals, input terminals connected to the DVD are output in an activated state, and the input terminal not connected to the DVD is output in a deactivated state. The connection state of the first group input terminals connected with one common external apparatus are output so that a user can more accurately determine the connection state of the external apparatus.

The output unit 120 displays movement of a cursor according to a movement command input through the input unit 150, to move the activated input terminal among the plurality of input terminals, and to skip the deactivated input terminal, while the graphic image is displayed on the screen. Accordingly, it is possible to prevent a user from selecting an input terminal which is not connected to an external apparatus.

If an enlargement display command of a specific input terminal image is input through the input unit 150 while the graphic image is displayed on the screen, the output unit 120 enlarges the input terminal image and outputs the enlarged input terminal image. For example, if a user moves a cursor to an image 'component 1', and presses a button 'enlargement', the enlargement display command of the specified image is input, and the enlarged image is output.

If a selection command of the specific input terminal image is input through the input unit 150 while the graphic image is displayed on the screen, the output unit 120 processes an external signal received from the specific input terminal, and outputs the processed external signal on the screen. That is, a user changes the input terminal by selecting the specific input terminal, and watches the external signal received from the changed input terminal.

Figure 3A:
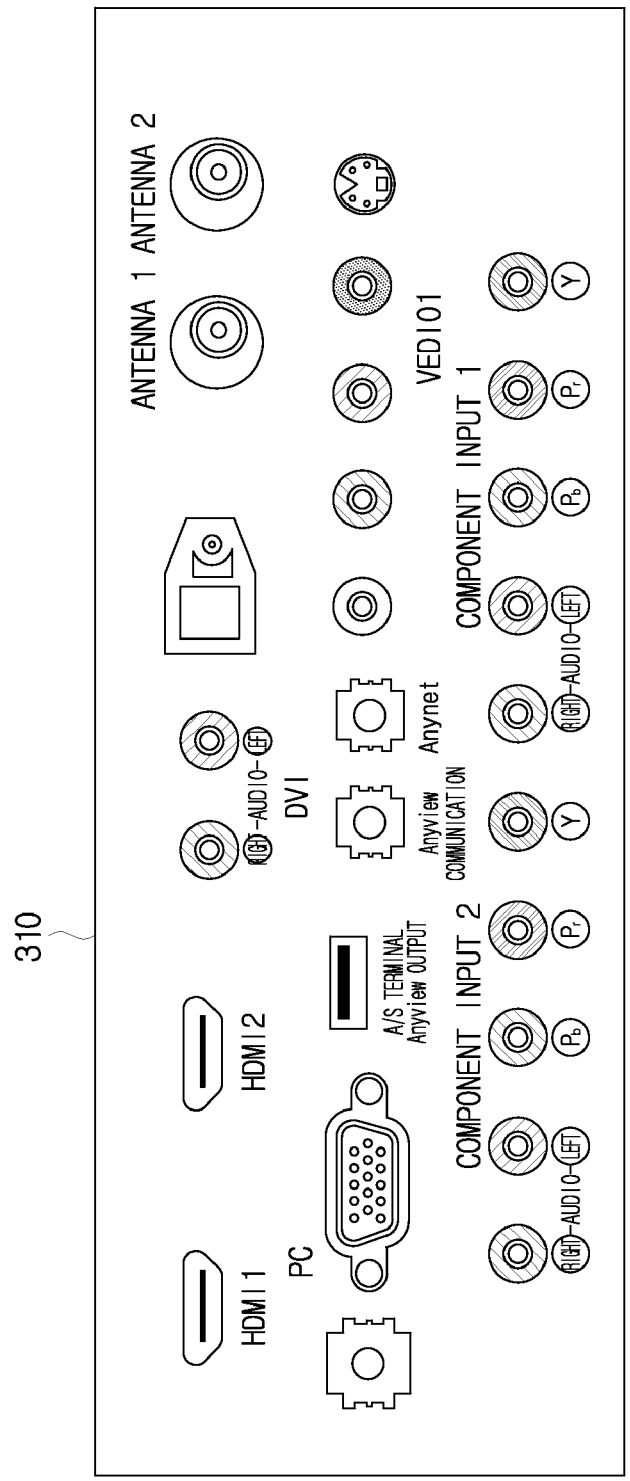
FIGS. 3A to 3C are views illustrating a plurality of input terminals according to an exemplary embodiment of the present invention.
Figure 3B:
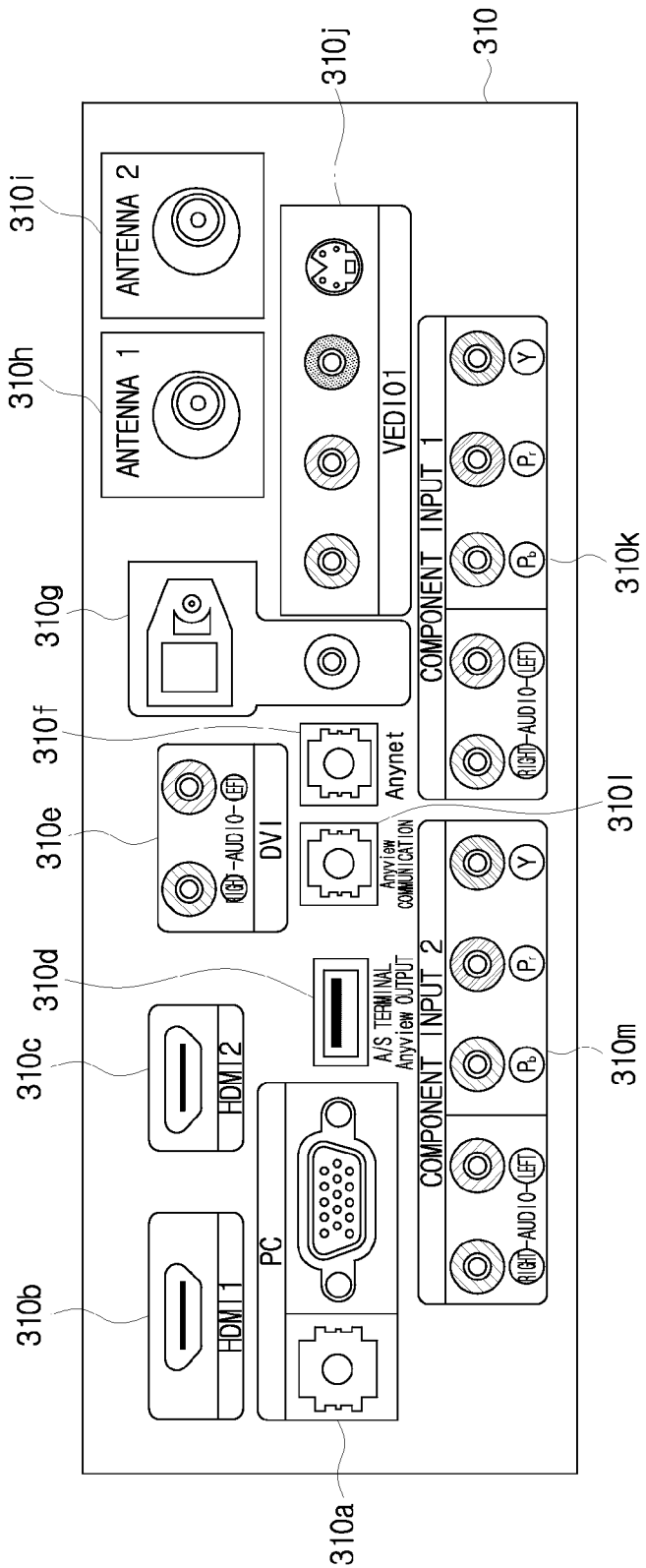
Figure 3C:
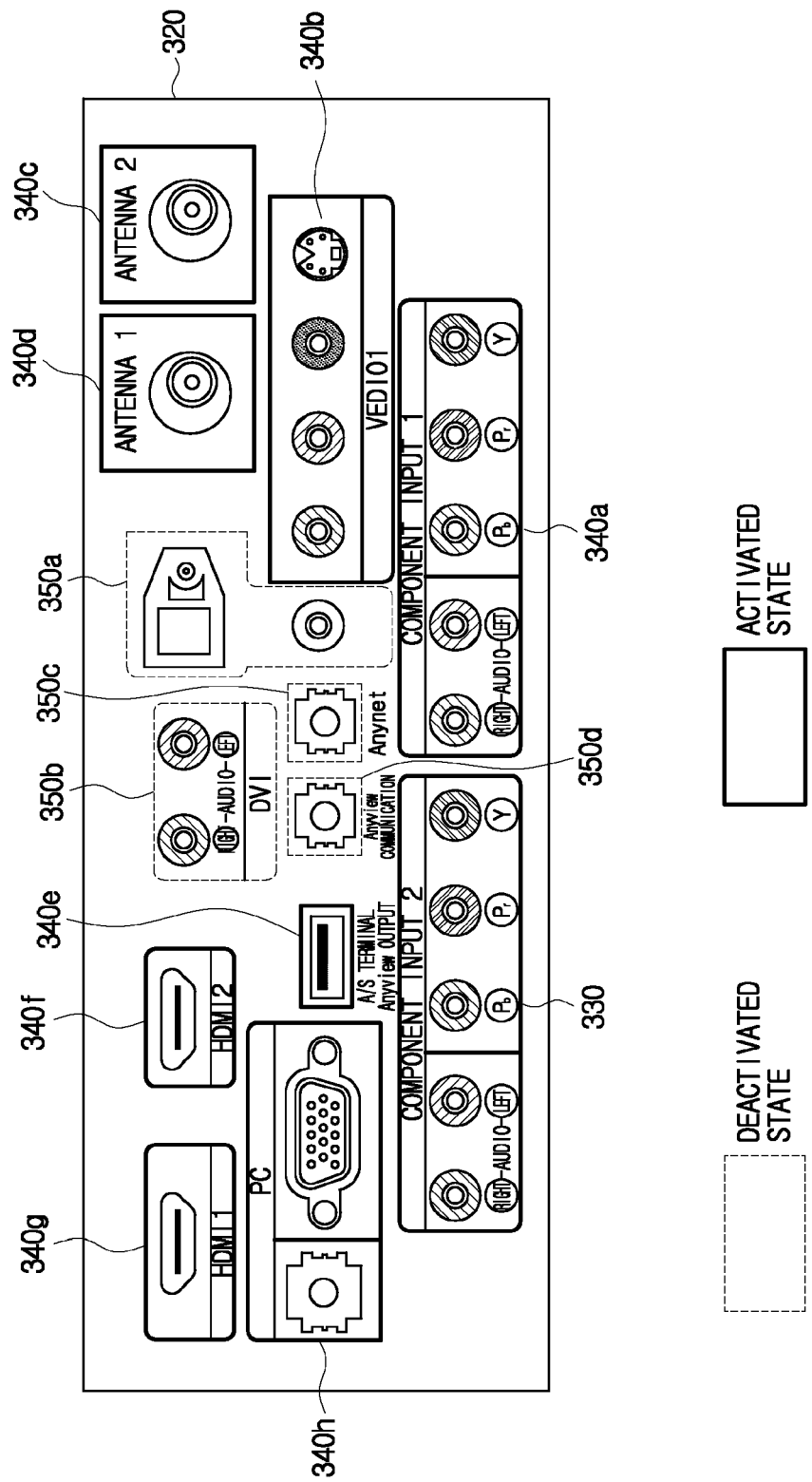

FIGS. 3A to 3C are views illustrating a plurality of input terminals according to an exemplary embodiment of the present invention. FIG. 3A is a view illustrating an image 310 corresponding to an actual lay out of a plurality of input terminals provided on the display apparatus 100 according to an exemplary embodiment of the present invention. As described above, the respective input terminals may be positioned on various sides of the display apparatus 100, such as the left or right side, or the top or bottom.

FIG. 3B is a view illustrating a graphic image 310 of a plurality of input terminals according to another exemplary embodiment of the present invention. Referring to FIG. 3B, a graphic image 310 displays images of the plurality of input terminals illustrated in FIG. 3A on the screen. The graphic image 310 classifies and displays images of the plurality of input terminals of the same apparatus. For example, two input terminals 310a for a PC are displayed on one block image indicating a PC. Accordingly, as images 310a to 310m are classified according to the input terminal they refers to the apparatus, a user can easily determine which input terminal is indicated by which apparatus.

FIG. 3C is a view illustrating a graphic image of a plurality of input terminals according to yet another exemplary embodiment of the present invention. Referring to FIG. 3C, the graphic image 320 may comprise an external signal output terminal 330, external apparatus connection apparatuses 340a to 340h, and non-external apparatus connection terminal images 350a to 350d.

The image of the external signal output terminal 330 corresponds to the external signal currently being output, and the external apparatus connection terminal images 340a to 340d indicate that the external apparatus is connected to an input terminal. The non-external apparatus connection terminal images 350a to 350d indicate that the external apparatus is not connected to an input terminal. Since the external signal output terminal image 330 and the external apparatus connection terminal images 340a to 340h are output on the graphic image 320 in an activated state, movement of a cursor is possible. On the other hand, since the non-external signal connection terminal images 350a to 350d are output in a deactivated status, the cursor may be skipped to the activated image when the cursor approaches the image.

If a user selects a specific input terminal image using a cursor on the image graphic 320, the display apparatus 100 outputs the external signal received from the specific input terminal on the screen. A user can easily check the connection state of the external apparatus and the connected external apparatus by referring to the graphic image.

Figure 4:
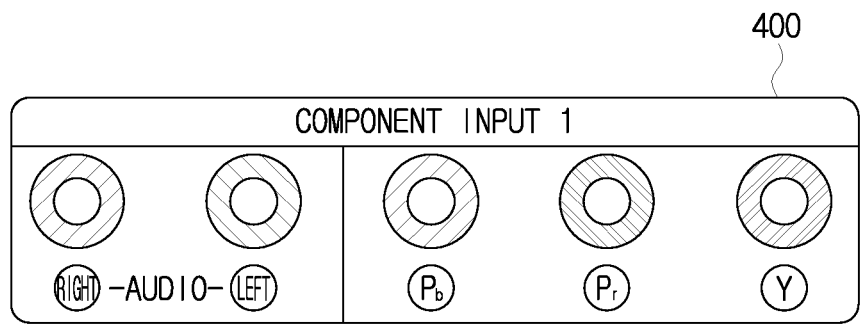
FIG. 4 is a view illustrating an enlarged graphic image according to an exemplary embodiment of the present invention.

FIG. 4 is a view illustrating an enlarged graphic image according to an exemplary embodiment of the present invention. Referring to FIG. 4, a graphic image 400 shows an enlargement of a specific output terminal. If a user presses an enlargement button while a cursor is moved on the specific input terminal image among the graphic images 320 illustrated in FIG. 3C, the specific input terminal image is enlarged, and the enlarged image is output on the screen. For example, if a user presses a key 'enlargement' while the cursor is positioned on the component image 340a of FIG. 3C, the enlarged graphic image 400 may be output. Accordingly, a user can check the connection with an external apparatus, facilitating connection with an external apparatus.

Figure 5:
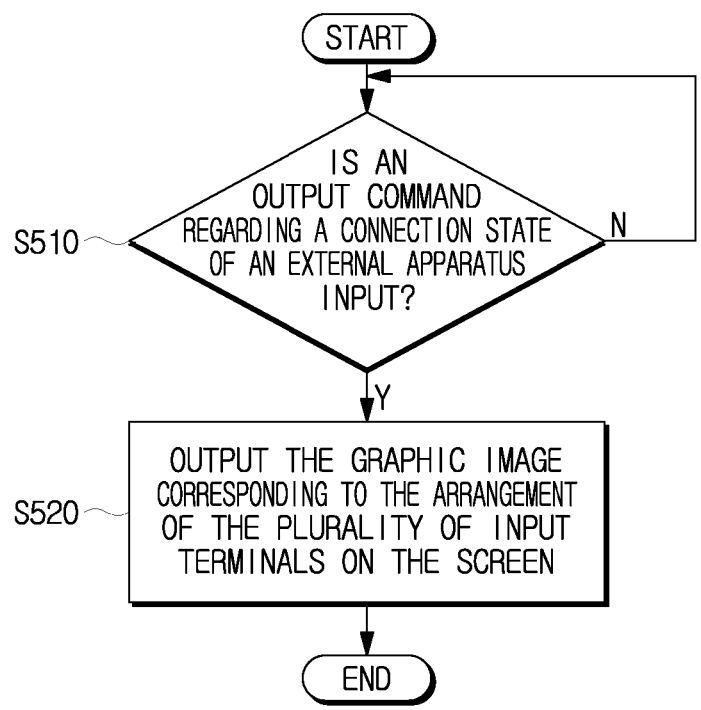
FIG. 5 is a flow chart illustrating a method for displaying a graphic image according to an exemplary embodiment of the present invention.

FIG. 5 is a flow chart illustrating a method for outputting a graphic image according to an exemplary embodiment of the present invention. Referring to FIG. 5, if an output command regarding a connection state of the external apparatus is input (S510), the display apparatus 100 outputs the graphic image corresponding to the arrangement of the plurality of input terminals on the screen (S520). The graphic image is identical to the arrangement of the plurality of input terminals which are provided on the back of the display apparatus 100. The connection state of the external apparatus is displayed differently according to whether the external apparatus is connected to the input terminal or not. That is, the color of an input terminal which is connected to the external apparatus is different from the color of an input terminal which is not connected to the external apparatus. Also, an input terminal which is not connected to the external apparatus may be opaquely represented. A user can easily recognize whether or not the external apparatus is connected according to characteristics of the graphic image.

Figure 6:
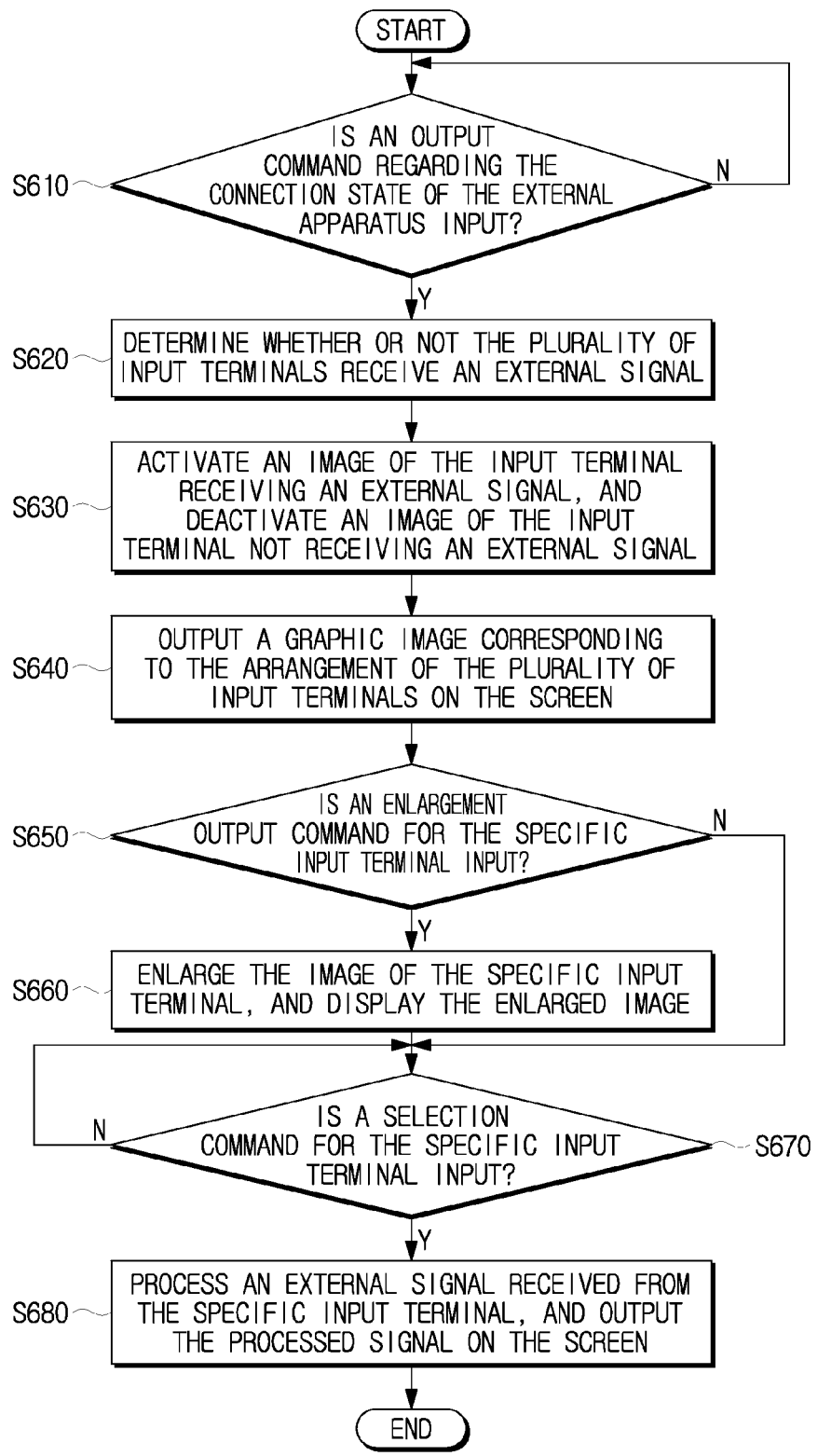
FIG. 6 is a detailed flow chart illustrating a method for displaying a graphic image according to an exemplary embodiment of the present invention.

FIG. 6 is a detailed flow chart illustrating a method for displaying a graphic image according to various exemplary embodiments of the present invention. Referring to FIG. 6, if an output command regarding the connection state of the external apparatus is input (S610), the display apparatus 100 determines whether or not the plurality of input terminals receive an external signal (S620). Whether or not the external signal is received is determined by detecting the voltage of the respective input terminals.

The display apparatus 100 reads a graphic image corresponding to the arrangement of the plurality of input terminals, activates an image of the input terminal receiving an external signal, and deactivates an image of the input terminal not receiving an external signal (S630).

The display apparatus 100 outputs a graphic image corresponding to the arrangement of the plurality of input terminals which are activated or deactivated on the screen (S640).

If an enlargement output command for the specific input terminal is input (S650) while the graphic image is displayed on the screen, the display apparatus 100 enlarges the image of the specific input terminal, and displays the enlarged image on the screen (S660).

If a selection command for the specific input terminal is input while the graphic image is output on the screen (S670), the display apparatus 100 processes an external signal received from the specific input terminal, and outputs the processed signal on the screen (S680). A user can easily check the connection state of the external apparatus, and check which input terminal is connected to which external apparatus by viewing the graphic image of arrangement of input terminals provided on the back of the display apparatus 100.

FIG. 6 comprises various exemplary embodiments such as a display for dividing an input terminal image, a display for enlarging an input terminal image, and a display for selecting an input terminal image. A graphic image including one or two of the exemplary embodiments may be displayed.

A user can easily check which external apparatus is connected to which input terminal by displaying on a screen a graphic image corresponding to the arrangement of a plurality of input terminals provided on the display apparatus. Additionally, the user can determine which external apparatus is connected to which input terminal by viewing the graphic image displaying the connection state of the plurality of external apparatuses so user convenience is improved.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A display apparatus comprising:
   a plurality of input terminals;
   an output unit which outputs on a screen a graphic image corresponding to an arrangement of the plurality of input terminals;
   a determining unit which determines whether or not each input terminal of the plurality of input terminals receives an external signal; and
   a control unit which controls the output unit to activate an image of an input terminal receiving an external signal, and to deactivate an image of an input terminal not receiving the external signal according to a determination by the determining unit.

2. The apparatus of claim 1, wherein the output unit classifies and outputs the graphic image corresponding to the arrangement of the plurality of input terminals according to a type of input terminal.

3. The apparatus of claim 1, wherein the output unit displays text indicating a type of input terminal at one side of the graphic image corresponding to the arrangement of the plurality of input terminals.

4. The apparatus of claim 1, wherein the output unit displays the output state of the input terminals connected to the same apparatus in an activated state or a deactivated state according to whether the input terminals are connected to said apparatus.

5. The apparatus of claim 1, further comprising:
   an input unit; and
   a storage unit which stores graphic images corresponding to the arrangement of the plurality of input terminals,
   wherein if an output command to display a connection state of the external apparatus is input through the input unit, the output unit displays on the screen the graphic image stored in the storage unit.

6. The apparatus of claim 5, wherein if a selection command of a specific input terminal image is input through the input unit while the graphic image is displayed on the screen, the output unit processes an external signal received from the specific input terminal, and outputs the processed external signal on the screen.

7. A display apparatus comprising:
   a plurality of input terminals;
   an output unit which outputs on a screen a graphic image corresponding to an arrangement of the plurality of input terminals;
   an input unit;
   a storage unit which stores graphic images corresponding to the arrangement of the plurality of input terminals,
   wherein if an output command to display a connection state of the external apparatus is input through the input unit, the output unit displays on the screen the graphic image stored in the storage unit, and
   wherein the output unit displays a cursor movement, so the cursor only moves over an image corresponding to an activated input terminal among the plurality of input terminals and skips over a deactivated input terminal, while the graphic image is displayed on the screen according to a movement command input through the input unit.

8. A display apparatus comprising:
   a plurality of input terminals;
   an output unit which outputs on a screen a graphic image corresponding to an arrangement of the plurality of input terminals;
   an input unit;
   a storage unit which stores graphic images corresponding to the arrangement of the plurality of input terminals,
   wherein if an output command to display a connection state of the external apparatus is input through the input unit, the output unit displays on the screen the graphic image stored in the storage unit, and
   wherein if an enlargement display command of a specific input terminal image is input through the input unit while the graphic image is displayed on the screen, the output unit enlarges the input terminal image and outputs the enlarged input terminal image.

9. A method for displaying a graphic image of a display apparatus having a plurality of input terminals, the method comprising:

receiving an output command to display a connection state of an external apparatus;
if the output command is input, outputting, via an output unit, a graphic image on a screen corresponding to an arrangement of the plurality of input terminals;
determining whether or not the plurality of input terminals receive an external signal, wherein the outputting comprises a control unit controlling the output unit to activate an image of an input terminal receiving an external signal, and to deactivate an image of an input terminal not receiving the external signal according to the determined result.

10. The method of claim 9, wherein the outputting comprises classifying and displaying on the screen the graphic image corresponding to the arrangement of the plurality of input terminals according to a type of input terminal.

11. The method of claim 9, wherein the outputting comprises displaying text indicating a type of input terminal at one side of the graphic image corresponding to the arrangement of the plurality of input terminals.

12. The method of claim 9, wherein the outputting comprises displaying the connection state of a first group of input terminals connected to the same apparatus as either an activated state or a deactivated state according to whether the input terminals are connected to said apparatus.

13. The method of claim 9, wherein if a selection command of a specific input terminal image is input while the graphic image is displayed on the screen, the outputting comprises processing an external signal received from the specific input terminal, and outputting the processed external signal on the screen.

14. A method for displaying a graphic image of a display apparatus having a plurality of input terminals, the method comprising:
receiving an output command to display a connection state of an external apparatus; and
if the output command is input, outputting a graphic image on a screen corresponding to an arrangement of the plurality of input terminals,
wherein the outputting comprises displaying movement of a cursor, to enable the cursor to move over an image of an activated input terminal among the plurality of input terminals, and to skip over an image of a deactivated input terminal according to an input cursor movement command.

15. A method for displaying a graphic image of a display apparatus having a plurality of input terminals, the method comprising:
receiving an output command to display a connection state of an external apparatus; and
if the output command is input, outputting a graphic image on a screen corresponding to an arrangement of the plurality of input terminals,
wherein if an enlargement display command of a specific input terminal image is input while the graphic image is displayed on the screen, the outputting comprises enlarging the input terminal image and outputting the enlarged input terminal image.

* * * * *